United States Patent [19]
Gotthelf

[11] Patent Number: 5,381,819
[45] Date of Patent: Jan. 17, 1995

[54] PRESSURE-REDUCING REGULATOR FOR COMPRESSED NATURAL GAS

[75] Inventor: Jeffrey B. Gotthelf, Charleston, S.C.
[73] Assignee: ITT Corporation, New York, N.Y.
[21] Appl. No.: 143,010
[22] Filed: Oct. 26, 1993

Related U.S. Application Data

[62] Division of Ser. No. 16,376, Feb. 11, 1993, Pat. No. 5,285,810.

[51] Int. Cl.⁶ .................................... G05D 16/02
[52] U.S. Cl. .................. 137/340; 137/484.8; 137/505.41
[58] Field of Search .............. 137/484.8, 340, 505.18, 137/505.41

[56] References Cited

U.S. PATENT DOCUMENTS

| | | | |
|---|---|---|---|
| 2,599,577 | 6/1952 | Norgren | 137/484.8 |
| 2,661,578 | 12/1953 | Niesemann | 137/484.8 |
| 2,755,633 | 7/1956 | McClain | 137/340 |
| 3,184,295 | 5/1965 | Bauerstock | 137/340 X |
| 5,285,810 | 2/1994 | Gotthelf | 137/340 |

FOREIGN PATENT DOCUMENTS 71127 12/1929 Sweden ..................... 137/484.8

Primary Examiner—Stephen M. Hepperle
Attorney, Agent, or Firm—Menotti J. Lombardi

[57] ABSTRACT

The valving element is positively tied to the diaphragm, through a diaphragm-carried insert which has a flow-accommodating groove formed therein to facilitate instant outlet pressure following a gas supply shut off. Too, the valving element cooperates with internal structures to define spaced apart seating and sealing areas which boundary between high and low pressures of the natural gas, and the magnitudes and directions of the differential pressures are balanced at the seating and sealing areas, and maintained in balance regardless of how inlet and outlet gas pressures vary.

4 Claims, 5 Drawing Sheets

PRESSURE-REDUCING REGULATOR FOR COMPRESSED NATURAL GAS

This application is a division, of application Ser. No. 08/016,376, filed Feb. 11, 1993 now U.S. Pat. No. 5,285,810

BACKGROUND OF THE INVENTION

This invention pertains to regulators for safely reducing high pressure natural gas to pressure levels which are usable in vehicular engines. There is a need for automobile makers to provide an alternative fuels capability in a percentage of their vehicles in this decade. Concomitantly, then, there is a need for a pressure-reducing regulator which can accommodate the high pressure natural gas, which is stored in vehicular storage tanks, and reduce it down to usable pressure levels, to facilitate the production of the alternative fuels automobiles.

A majority of pressure-reducing regluators for compressed natural gas, as are known in the prior art, lack a balanced valve design. Accordingly, the output pressure can fluctuate widely, as the using vehicle consumes the fuel. To overcome this drawback, typically two of such regulators are employed to provide an acceptable regulation. Exemplary of this type of regulator is the Type P NGV Regulator, or the Type P NGV Regulator with Enviro-Cap, manufactured and sold by Modern Engineering Company, Inc. of Gallman, Miss. Other prior art regulators use pistons to sense and track the outlet pressure and control the regulator. Such pistons, which carries seals, usually O-rings, manifest a response lag arising from the frictional drag of the seals. Regulators of this latter type are offered by the Tescom Corporation.

U.S. Pat. No. 3,712,333, issued to Albert L. Semon, on Jan. 23, 1973, for a Fluid Pressure Compensating Regulator, sets forth a valving element of square cross section, which requires that the corners of the same slidably and frictionally translate through a housing. Too, it has a diaphragm-carried insert which, when the diaphragm bottoms, has no gas flow accommodation provided therein.

It is a purpose of this invention to set forth a pressure-reducing regulator which, by itself, is usable in vehicular applications, and is of efficient and uncomplicated structure, the same having a balanced valving element arrangement which has minimal frictional drag.

SUMMARY OF THE INVENTION

It is an object of this invention to disclose a pressure-reducing regulator for compressed natural gas, comprising a regulator body; said body having (a) an inner chamber for receiving high-pressure gas therein, and (b) an outer chamber for discharging low-pressure gas therefrom; porting means, formed in said body, for admitting gas into said inner chamber, and for discharging gas from said outer chamber; and valving means, within said body, for controlling fluid communication between said chambers; wherein said inner chamber and said valving means have structural means which cooperatively define (a) a seating area, and (b) a sealing area for said valving means; both said areas comprise means for defining boundaries between differential pressures of inner chamber high-pressure gas and outer chamber low-pressure gas; and said valving means comprises means for (a) equalizing magnitudes of forces of such differential pressures, (b) directing such forces in balanced opposition, in said areas, and (c) maintaining equalization of such forces and oppositely-directed balancing thereof, in said areas, regardless of how pressures of such inner chamber high-pressure gas and such outer chamber low-pressure gas vary.

It is also an object of this invention to set forth a pressure-reducing regulator, as summarized in the foregoing, wherein said body further has means for inhibiting an icing of said regulator, said inhibiting means comprising means for enveloping at least said inner chamber and said valving means with a heating medium. In this, said enveloping means comprises means for (a) pooling a heating medium therein, and (b) admitting and discharging such heating medium thereto and therefrom.

Further objects of this invention, as well as the novel features thereof, will become apparent by reference to the following description in conjunction with the accompanying figures.

A BRIEF DESCRIPTION OF THE DRAWINGS

Figure 2:
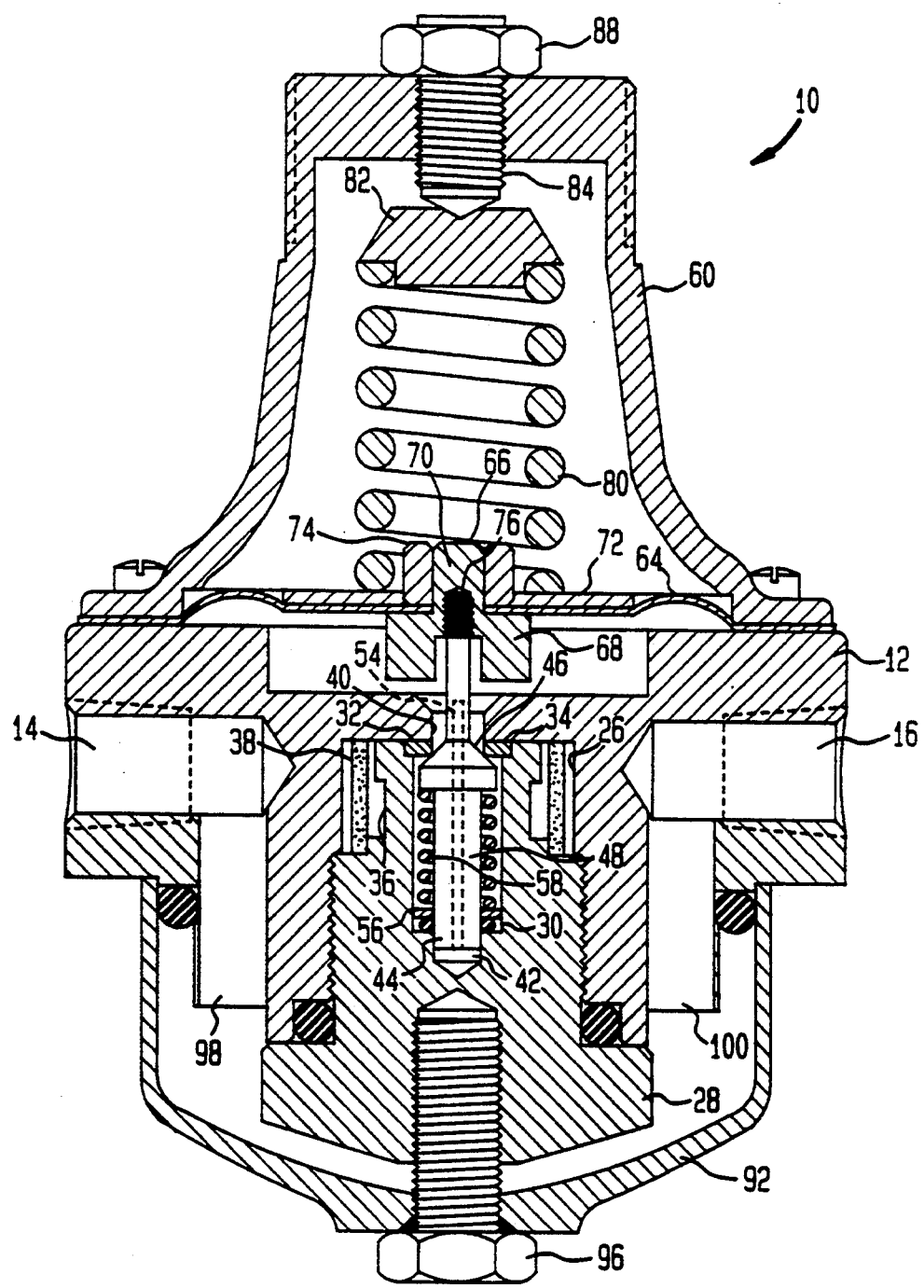
FIG. 2 is a cross-sectional view of the regulator of FIG. 1, taken along section 2—2 of FIG. 1, the scale of FIG. 2 being slightly enlarged over the scale of FIG. 1.
Figure 3:
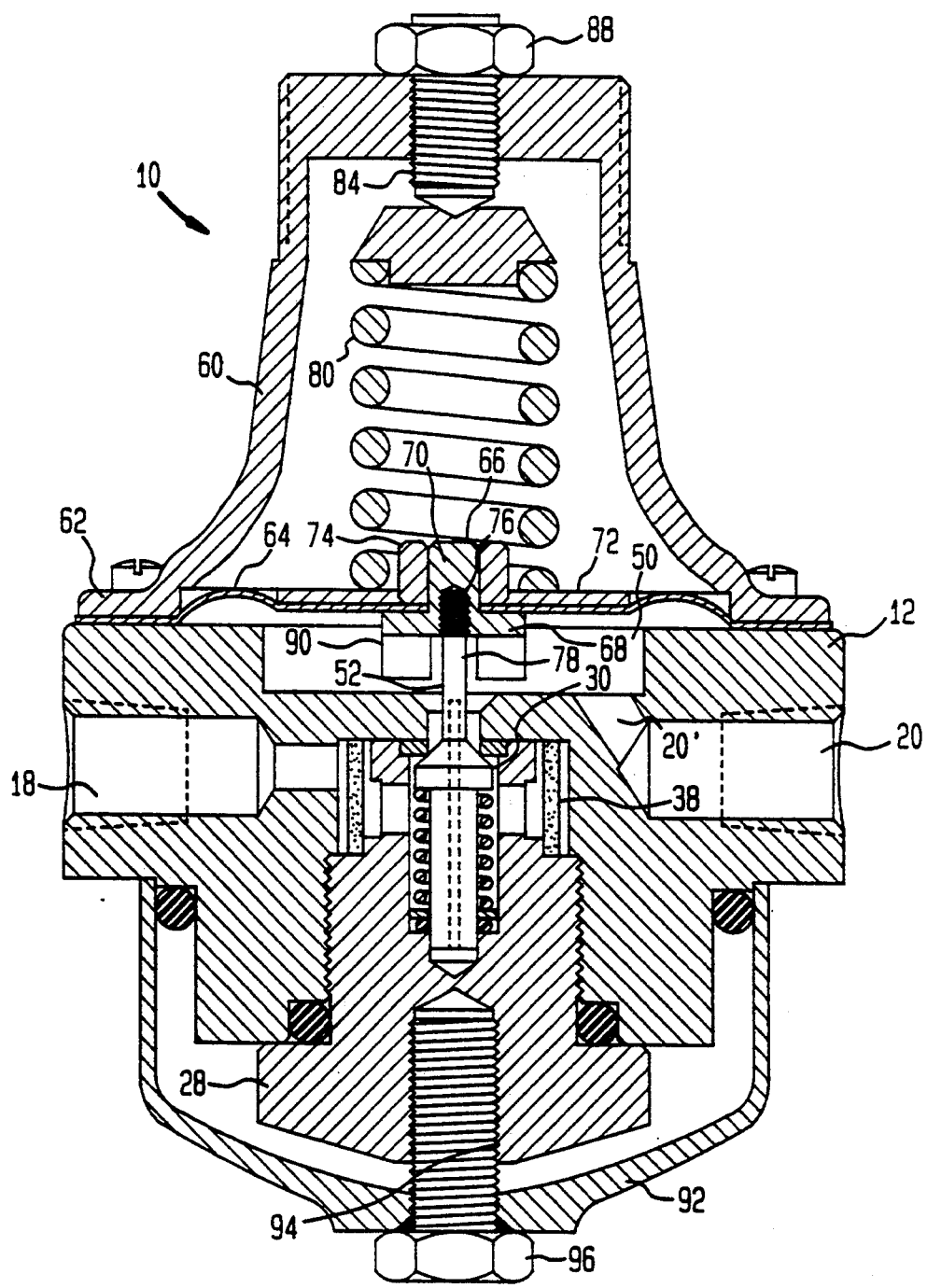
FIG. 3 is a cross-sectional view of the regulator of FIGS. 1 and 2, taken along section 3—3 of FIG. 1, the same being of substantially the same scale as FIGS. 2.
Figure 5:
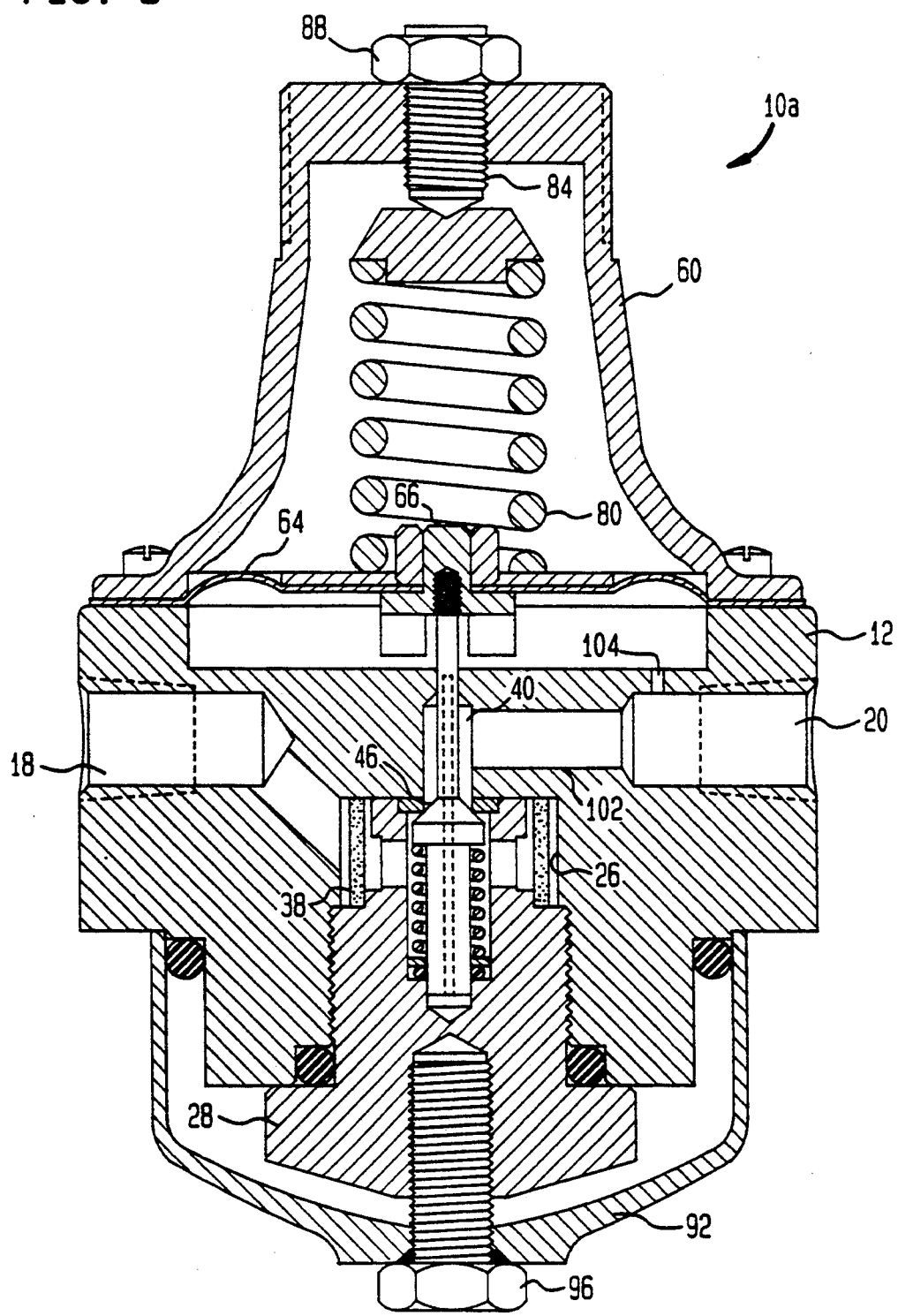

4 is an illustration of a portion of the regulator, showing the valve seat and valving element, the same representing the pressures and forces acting across the element; this figure too is slightly enlarged over the scale of FIGS. 2 and 3; and FIG. 5 is an illustration similar to that of FIG. 3, albeit of an alternative embodiment of the invention.

DESCRIPTION OF THE PREFERRED EMBODIMENT

Figure 1:
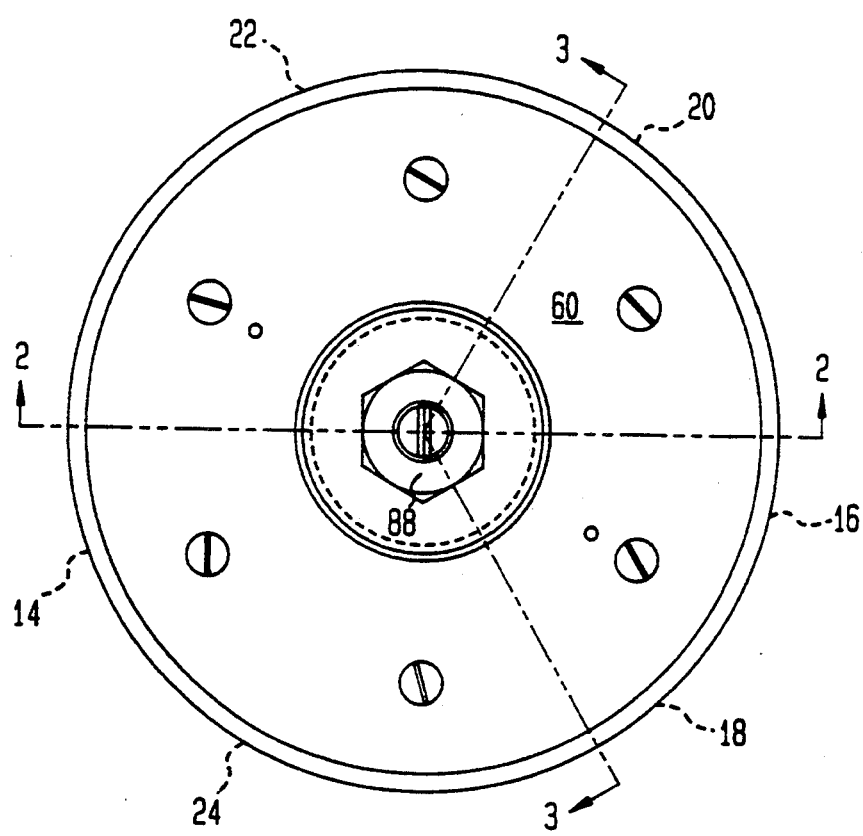
FIG. 1 is a plan or top view of the novel regulator, according to an embodiment thereof.

The novel regulator 10, according to an embodiment thereof, has a regulator body 12 in which are formed six connection ports (only four of which are shown). Ports 14 and 16 accommodate for the inlet and discharge, respectively, of a heating fluid. Ports 18 and 20 accommodate for the admittance of high-pressure natural gas, and discharge of low-pressure gas, respectively. Two further ports 22 and 24, indicated by the dashed lines in FIG. 1, not seen, are provided for an inlet gauge and an outlet gauge or relief valve, respectively, according to a practice well known in this art.

The regulator body 12 has a central void 26 which is threaded partly therealong. The void threadedly receives therein a control valve body 28. Body 28 has a cylindrical bore 30 formed therein with an annular recess 32 formed in an outer termination of the bore 30. An apertured valve seat 34 is set in the recess 32. Control valve body 28 further has an outer, annular, reduced diameter portion 36 about which is positioned a cylindrical filter 38. Bore 30 opens onto a channel 40 formed in the body 12, and at the opposite end thereof, terminates in a cylindrical recess 42. A valving element 44, having a tapered-nose head 46 and an elongate shank 48, is confined within bore 30; the shank 48 is received at an end thereof in the recess 42, and the leading end of the head 46 is received in the valve seat 34.

An uppermost portion of the regulator body 12 has a circular recess 50 formed therein which, centrally thereof, is in fluid communication with the channel 40. Integral with the head 46 is a slender stem 52. The stem 52 protrudes through the channel 40 and the recess 50. The shank 48, head 46 and stem 52 have a continuous passage 54 formed therein and therethrough. The passage 54 opens at one end thereof onto the recess 50, and at the other end onto the shank-receiving recess 42. About the lower portion of the shank 48 is disposed an O-ring seal 55. A rimmed plate 56, centrally apertured, is set atop the O-ring seal 55. Plate 56 comprises a bearing surface for an end of a compression spring 58 which is circumjacent the shank 48; the opposite end of the spring 58 is set against an underlying, annular shoulder of head 46.

A hollow bonnet 60, having a radially-extending flange 62 is bolted, via the flange 62, to the uppermost portion of the regulator body 12. A diaphragm 64 is clamped, by means of its outer periphery, between the flange 62 and the body 12.

The diaphragm 64 is centrally apertured, and receives therethrough an insert 66. Insert 66 has a circular, plate-like portion 68 which underlies the diaphragm, and a threaded stub 70 which extends above the diaphragm 64. A diaphragm plate 72 is set about the stub 70 and a lock nut 74 is made fast on the stub and against the plate 72. The insert 66 has a threaded bore 76 formed therein, and receives therein the threaded end 78 of stem 52. A compression spring 80 is set, at one end thereof, about the nut 74 and upon plate 72. The opposite end of the spring 80 receives therein a button 82. An adjustment screw 84, which protrudes through the uppermost end of the bonnet 60, and is threadedly engaged with a threaded bore 86 thereat, bears against the button 82, and externally of the bonnet 60 receives a jam nut 88. Portion 68 of the insert 66 has a groove 90 formed therein which extends fully thereacross.

A centrally-bored bowl 92 is made fast to an underside of the regulator body 12. The body 12 has a threaded bore 94 formed in the underlying portion thereof to receive therein the headed bolt 96 which secures the bowl 92 in place. Channels 98 and 100 formed in the body are in open communication with the ports 14 and 16. Consequently, then, a heating fluid, such as vehicular coolant, being admitted via port 14 will course through channel 98, to pool in the bowl 92, and exit via channel 100 and port 16. The depth of the bowl is such that heating fluid conducted thereto can heat exchange, directly, with the control valve body 28, and that portion of the regulator body 12 in which are confined the filter 38 and valving element 44 has the fluid addressed to opposite sides thereof and thereabout. Consequently, icing of the regulator 10 is prevented.

Figure 4:
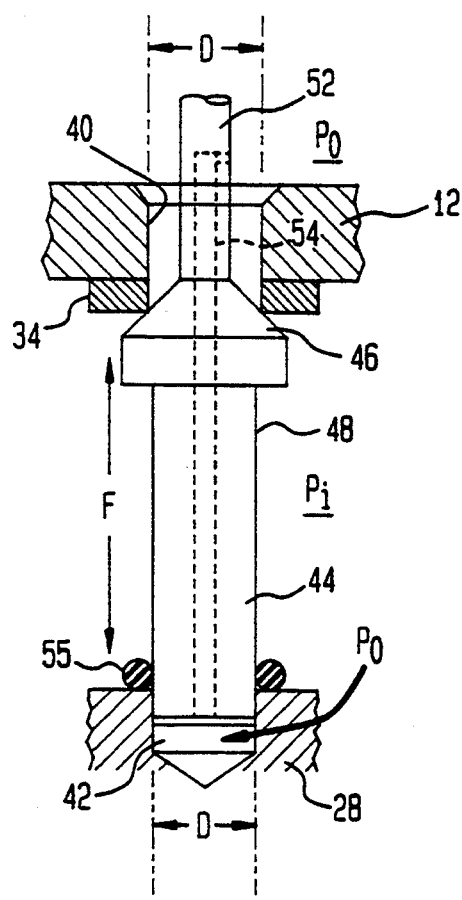

The diaphragm 64 forms one wall which closes off the recess 50, and this forms an outer chamber of the recess, and that amount of void 26 in the regulator body 12 which is not occupied defines an inner chamber thereof. The high pressure natural gas enters the inner chamber, i.e., void 26, via the port 18, and passes through the filter 38. Herein, the gas is metered by the balanced valving element 44. With particular reference to FIG. 4, the balancing of the element 44 can be readily understood. The seating area between the head 46 of the valving element 44 and the valve seat 34 defines a first boundary between the inlet gas pressure, in the inner chamber of void 26, and the outlet gas pressure in the outer chamber of recess 50. The gas pressure differential thereat creates an upwardly directed force, the magnitude of which varies proportionally with the differential pressure. The passage 54 in the valving element 44 communicates the outlet gas pressure in the outer chamber of recess 50 to a volume obtaining beneath the valving element 44 in the recess 42. Consequently, a second boundary between the inlet pressure, in the inner chamber of void 26, and the outlet pressure in the recess 42, is defined between the shank 48 and the O-ring seal 55. The gas pressure differential thereat creates a downwardly directed force, the magnitude of which varies proportionally with the differential pressure. In FIG. 4, the locus of the inlet pressure is represented by "Pi", and that of the outlet pressure is represented by "Po". The two, aforesaid boundary areas, one where the head 46 engages the seat 34, and the other, the sealing area between the shank 48 and the O-ring seal 55, are of the same diameter "D". As a consequence, the oppositely directed forces "F" are equalized in magnitude. Too, regardless of how the inlet pressure "Pi" and/or the outlet pressure "Po" varies, the forces and magnitude of the differential pressures, at the two boundary areas, will be maintained in balanced opposition.

The spring 58 provides an upward force to move the valving element 44 upwardly, when no other forces are present. Additionally, the spring 58 applies a biasing force on the rimmed plate 56. The plate 56 maintains the geometry of the O-ring seal 55 so that the latter can positively seal against the shank 48.

As easlier noted, portion 68 of the diaphragm insert 66 has the groove 90 formed therein and fully thereacross. This feature permits gas flow, via the groove 90, even when the diaphragm has bottomed against the uppermost surface of the regulator body 12. This is especially beneficial in a using vehicle which has a compressed natural gas system with a supply shut off. The groove 90 insures an instant outlet pressure availabilitu when the system supply is turned on.

To operate the regulator 10 and set the outlet pressure, the end user turns the adjustment screw 84 to move the button 82 downwardly. This compresses the spring 80 which forces the diaphragm 64 downwardly. Such movement of the diaphragm 64 concomitantly moves the valving element 44 downwardly. Resultantly, the head 46 removes from the valve seat 34 to open communication between the inner chamber of void 26 and the outer chamber of recess 50. As the inlet pressure is much greater than the outlet pressure, gas flow will occur, and the outlet pressure will increase. The outlet pressure acts against the surface of the diaphragm 64, exerting an upward force opposing the bias of the spring 80, to effect an equilibrium. If the spring force increases, the outlet pressure will increase to maintain the equilibrium. Too, if the inlet pressure diminishes, as when the pressure in the supply cylinder decreases, the aforesaid equilibrium will remain unchanged; this is due to the aforedescribed balanced valving feature. This is a novel advantage which allows just a single regulator 10 of this design to meet the needs of a compressed natural gas vehicle.

The alternative embodiment 10a of the invention, shown in FIG. 5, provides a communication for the gas flow directly to an outlet port, rather than having the gas work against the diaphragm, for advantages noted in the following. In FIG. 5, same or similar index numbers denote same or similar parts and/or components as those so-indexed in FIGS. 2 and 3.

In circumstances where there are high flow rates of the subject gas, there obtains the possibility of diaphragm 64 and diaphragm insert 66 oscillation or instability. Consequently, then, the momentum or force of the gas would endeavor to move the valving element 44 to a closed position. Embodiment 10a of FIG. 5 eliminates the aforenoted instability and closure of the valving element 44, by providing a passage 102 which directly communicates the void 26, i.e., the inner chamber, with the gas discharge port 20. Whereas port 20, in embodiment 10 had a large passage 20' opening onto the outer chamber, i.e., between the diaphragm 64 and the recess 50, it is replaced, in this embodiment 10a, with a droop correction or aspirator hole 104. The latter is provided to reduce the pressure drop which is associated with increasing flow rates. Too, with the provisioning of the passage 102, in bypass of the diaphragm 64, the groove 90 in the diaphragm insert 66 is not necessary in embodiment 10a; it can be omitted.

The anticipated primary application of the regulators 10 and 10a, as noted herein, is as pressure reducers for high pressure, compressed natural gas-fueled vehicles. Other applications, however, can be found in controlled pressure reductions of compressed gases in industrial and research endeavors where additional heat input, to prevent moisture freezing or excessive cooling, is required.

While I have described my invention in connection with specific embodiments thereof, it is to be clearly understood that this is done only by way of example, and not as a limitation to the scope of the invention as set forth in the objects thereof and in the appended claims. For example, in lieu of the adjustment screw 84, a screw, such as a set screw or the like, could be used and factory-set and sealed, with a plug, epoxy, or such, to render the regulator 10 or 10a tamperproof. In addition, vehicular coolant need not be the only medium for heating the regulator 10 or 10a to prevent or inhibit icing thereof. Electrical heating could be used as well and, for employing the bowl 92, it would be most facile to connect an electrical heating element thereto and arrange electrical connectors therefor whereever most convenient and accessible. Such further alternative features will suggest themselves to others by taking teaching from my disclosure herein, and are deemed to be within the ambit of my invention and embraced by the appended claims.

I claim:

1. A pressure-reducing regulator for compressed natural gas, comprising in combination:

a regulator body;

said body having (a) an inner chamber for receiving high-pressure gas therein, and (b) an outer chamber circular recess formed therein; and a diaphragm fixed in said body; wherein said diaphragm with said recess comprises an outer chamber;

porting means for admitting gas into said body;

porting means for discharging gas from said body;

valving means, movably disposed in said body, for controlling fluid flow between said porting means;

said valving means includes a valving element having a stem portion, a tapered-nose head portion and a shank portion with a bore formed through said element connecting said inner and outer chambers;

said stem being coupled to said diaphragm and said body have a channel and a cylindrical recess formed therein for accommodating respectively, said stem and shank portions;

said body further including a valve seat having an orifice formed therein for passage of said stem portion and sealing closure with said tapered-nose head portion of said element;

means formed in said body for inhibiting unwarranted oscillation of said diaphragm;

said body further has means for inhibiting an icing of said regulator;

said icing inhibiting means comprising means for enveloping at least said inner chamber and said valving means with a heating medium; and said enveloping means comprises means for containing a heating medium therein, and means for admitting and discharging such heating medium thereto and therefrom.

2. A pressure-reducing regulator, according to claim 1, wherein:

said oscillation inhibiting means comprises a passage opening at opposite ends thereof onto said channel and onto said gas discharging porting means, in shunting bypass of said diaphragm.

3. A pressure-reducing regulator, according to claim 2, further including:

means formed in said body for communicating said outer chamber with said gas discharging porting means.

4. A pressure-reducing regulator, according to claim 3, wherein:

said communicating means comprises an aspirator hole.

* * * * *